US000001410H

United States Statutory Invention Registration [19]

[11] Reg. Number: H1410

Hartley

[43] Published: Jan. 3, 1995

[54] H-INFINITY CONTROLLER FOR AN ELECTRO-MECHANICAL ACTUATOR

[75] Inventor: Gerald A. Hartley, Ridgecrest, Calif.

[73] Assignee: The United States of America as represented by the Secretary of the Navy, Washington, D.C.

[21] Appl. No.: 63,226

[22] Filed: May 17, 1993

[51] Int. Cl.[6] ..... G05B 13/02

[52] U.S. Cl. ..... 364/148; 341/144

[56] References Cited

U.S. PATENT DOCUMENTS 4,677,507 6/1987 Elliot ..... 360/78

4,684,922 8/1987 Minogue ..... 341/144

OTHER PUBLICATIONS

Hostetter et al., *Design of Feedback Control Systems, Copyright* © 1982 CBS College Publishing, pp. 485, 510 and 515–522.

Analog Devices, Inc. *Analog–Digital Conversion Handbook,* © 1986, pp. 628–634, Library of Congress Catalog No. 85–62726.

Technical Publication #A8AA–92–4314–CP by Gerald A. Harley; pp. 80 Through 86, Inclusive; Title: H–Infinity Controller Design for an SISO Electromechanical Actuator.

*Primary Examiner*—Bernarr E. Gregory

*Attorney, Agent, or Firm*—Robert J. Hampsch; Melvin J. Sliwka; John L. Forrest, Jr.

[57] ABSTRACT

A single-input single-output control system includes an $H_\infty$ controller having an input for receiving an command input signal and an output for producing an output signal, an electro-mechanical (E-M) actuator connected in series with the $H_\infty$ controller and having an input for receiving the output signal from the $H_\infty$ controller and an output for producing an output signal representative of an action taken by the E-M actuator, and a feedback loop connected in series with the E-M actuator and the $H_\infty$ controller for transferring the output signal of the E-M actuator to the input of the $H_\infty$ controller for combining with the command input signal and inputting an error input signal to the $H_\infty$ controller. The $H_\infty$ controller performs a time-related sequence of samples and continuously holding a predetermined number of most recent ones of the samples and modifies the samples by applying predetermined constants thereto to derive the error signal outputted to the E-M actuator in order to improve the stability of the E-M actuator.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

H-INFINITY CONTROLLER FOR AN ELECTRO-MECHANICAL ACTUATOR

BACKGROUND OF THE INVENTION

The present invention generally relates to techniques for controlling an electromechanical actuator and, more particularly, is concerned with an $H_\infty$ controller for improving the operating characteristics of an electromechanical actuator. Specifically, the uses a robust control design technique called $H_\infty$ synthesis to design a controller to shape the frequency response characteristics to improve stability and performance characteristics of an electro-mechanical actuator. The following discussion of $H_\infty$ control design theory as applied to and electro-mechanical actuator is from a published paper AIAA-92-4314-CP "$H_\infty$ Controller Design for an SISO Electromechanical Actuator" presented to the American Institute of Aeronautics and Astronautics (AIAA) Guidance, Navigation and Control Conference on Aug. 9, 1992

$H_\infty$ robust control design allows shaping of the frequency response of the feedback characteristics of a system by increasing the system gain in the lower frequency bands for performance enhancement while suppressing gains at the higher frequencies so as not to excite structural dynamics. Heretofore, $H_\infty$ design has been applied to a multiple-input multiple-output control system, such as in the case of autopilot design, to achieve a high performance but robustly stable design. The $H_\infty$ implementation has required sophisticated microprocessor chips with the memory capacity to handle all of the states in the state space model.

In the past, the bandwidth of actuators were limited to that which would not excite structural modes and the existing autopilot designs could not utilize larger a bandwidth anyway. Improvements in autopilot designs using modern control design theory allow the utilization of better performing actuators. When structural modes are found to be excited by the actuators usually a filter is placed either in the feedback or feedforward path which introduces a phase lag to reduce the responsiveness of the control system to an actuator with too large a bandwidth.

As briefly noted above, the $H_\infty$ control theory involves singular value loop shaping of the sensitivity and complementary sensitivity matrices based on the singular value Bode plot. Ordinarily, $H_\infty$ control theory is used for multivariable-input multivariable-output (MIMO) systems but can be applied to a single-input single-output (SISO) disclosure. The singular values of a matrix is defined as the positive square roots of the eigenvalues of the product of the matrix and its transpose. The transfer function sensitivity matrix S and is given by $$S(s)=[I(n)+L(s)]^{-1}$$

were I(n) is the identity matrix or unity matrix of size (n×n) with 1's on the main diagonal and 0's elsewhere, "s" is the Laplacian operator equal to j*omega, j is $\sqrt{(-1)}$, omega is the frequency in radian/sec and L(s) is the loop gain matrix. A large loop L(s) means that the sensitivity matrix will have small singular values so that a disturbance at the actuator output A will have little effect on the error input to the $H_\infty$ controller. Good disturbance rejection is highly desirable for a controller. The complementary sensitivity matrix is the transfer function from I to actuator output A or the system transfer function given by $$T(s)=L(s)^*[I(n)+L(s)]^{-1}=I(n)-S(s)$$

A small value of loop gain L(s) means that T(s) is small while a large loop gain L(s) will drive T(s) to the identity matrix while S(s) goes small.

The term $H_\infty$ derives from taking the infinity norm of the maximum singular values of a matrix over all frequencies. If a matrix has size n, there are n eigenvalues. The singular values of a matrix G are defined as the non-negative square roots of the eigenvalues of the product of matrix G and its transpose G*. The most useful property of the maximum singular value concept is that the maximal "gain" of a matrix over all frequencies is given by the peak of the maximum singular value over all frequencies. The $H_\infty$ norm, $\|G\|_\infty$, is thus defined by $$\|G\|_\infty=sup_\omega(\acute{o}_{max}(G(j\omega))$$

where sup is the least upper bound over all frequencies $\omega$. Assuring that the infinity norm of G is $<=1$ over all frequencies means it is robust and will not be unstable under any foreseeable conditions.

The $H_\infty$ control design is performed in the frequency domain with specifications on performance governing the frequency loop shaping of the sensitivity matrix and robustness governing the frequency loop shaping of the complementary sensitivity matrix. If one was not worried about exciting structural modes or unmodeled high frequency dynamics, it would be logical to have as high a loop gain as possible over the whole frequency range. The robustness specification $|W_3(s)^{-1}|$ suppresses the maximum singular values at the higher frequencies for the complementary sensitivity matrix or system transfer function so as not to excite unmodeled plant dynamics or fundamental structural frequencies. The performance specification $|W_1(s)^{-1}|$ suppresses the sensitivity matrix maximum singular values at the lower frequencies for good disturbance rejection and minimization of steady-state error through high low frequency loop gains. The 0 Db or magnitude=1 crossover frequency of the performance specification must be sufficiently below the 0 Db frequency crossover of the robustness specification for a $H_\infty$ solution to exist. Commercial software in the Mathwork's MATLAB Robust Control Toolbox for $H_\infty$ design were utilized in the design example in the AIAA paper cited. An iterative procedure was followed in which the loop gain was increased for a given performance specification which drove the maximum singular value of the sensitivity matrix to the performance boundary and simultaneously drove the maximum singular value of the complementary sensitivity matrix to the robustness boundary at a higher frequency range.

SUMMARY OF THE INVENTION

The present invention provides an $H_\infty$ controller-based single-input single-output control system which in a missile application permits increase of the bandwidth of an electro-mechanical actuator to take full advantage of the missile airframe design without causing undesirable oscillations which would impair control of the missile.

The control system of the present invention has the potential to increase the maneuverability of tactical missiles without inducing airframe oscillations that are usually associated with high bandwidth actuators. For that matter, the control system may improve the operating characteristics of any device that employs an actuator.

Accordingly, the present invention is directed to a single-input single-output control system which comprises: (a) an $H_\infty$ controller having an input for receiving an command input signal and an output for producing an output control signal; (b) an electromechanical (E-M) actuator connected in series with the $H_\infty$ controller and having an input for receiving the output signal from the $H_\infty$ controller and an output for producing an output signal representative of an action taken by the E-M actuator; and (c) a feedback loop connected in series with the E-M actuator and the $H_\infty$ controller for transferring the output signal of the E-M actuator to the command input signal thereby forming an error input signal to the $H_\infty$ controller; (d) the $H_\infty$ controller performing a time-related sequence of samples and continuously holding a predetermined number of most recent ones of the samples and modifying the samples by applying predetermined constants thereto to derive the error signal outputted to the E-M actuator in order to improve the stability of the E-M actuator. The control system further comprises a digital-to-analog (D/A) converter interposed in series between the $H_\infty$ controller and the E-M actuator, and an analog-to-digital (A/D) converter interposed in the feedback loop in series between the E-M actuator and the $H_\infty$ controller.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
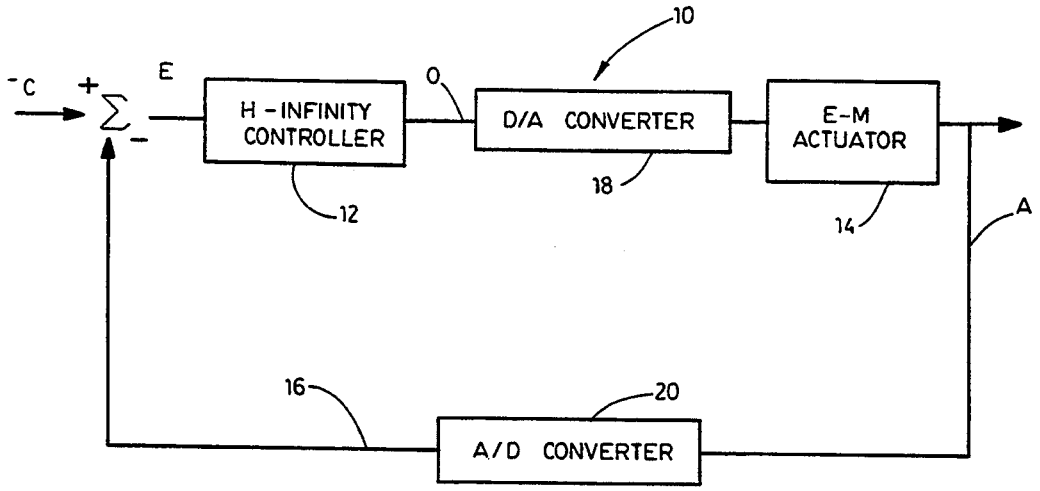
FIG. 1 is a general block diagram of a single-input single-output control system in accordance with the principles of the present invention.

Referring now to the drawings, and particularly to FIG. 1, there is shown a general block diagram of a single-input single-output control system, generally designated by the numeral 10, which employs an $H_\infty$ controller (12) in series with an electromechanical (E-M) actuator (14) and with a negative unity feedback loop (16) in accordance with the principles of the present invention. In view that the $H_\infty$ controller (12) is a digital device and the E-M actuator (14) is an analog device, a digital-to-analog (D/A) converter (18) is required between the $H_\infty$ controller (12) and the E-M actuator (14) and an analog-to-digital (A/D) converter (20) is required in the feedback loop (16) between the E-M actuator (14) and the $H_\infty$ controller (12).

The $H_\infty$ controller (12) is implemented in a state space representation. The D/A converter (18) uses a zero order hold in sampling the control output O of the $H_\infty$ controller (12) for input to the E-M actuator (14). The zero order hold means that the output O from the $H_\infty$ controller (12) is sampled and held for command to the E-M actuator (14) until a new command signal is sampled $T_s$ seconds later.

The A/D conversion of the output signal A from the E-M actuator (14) is performed by the A/D converter (20) to provide negative feedback to the input command signal C to form an error signal E for input to the $H_\infty$ controller (12). The A/D converter (20) uses a Tustin bi-linear transformation to go from a continuous S-plane analog space to a Z-plane discrete space for the digital implementation of the $H_\infty$ controller (12).

The single-input single-output control system (10) cam be advantageously implemented on a commercially-available digital signal processor (DSP) chip. The DSP chip is preferably used instead of a standard microprocessor chip because of the much greater processing speed and signal processing capability of the DSP chip. The DSP chip has signal processing algorithms, fast Fourier transforms, etc., implemented on it so that it can operate at a much higher frequency and bandwidth than a standard microprocessor chip in order to carry out the computations that are being fed into the EM actuator (14). The faster processing speed of the DSP chip allows sampling rates of 100 Hz or better for a sampling period $T_s$ of 0.010 second or less. Also, the algorithms for the $H_\infty$ controller (12) and the D/A and A/D converters (18), (20) are embedded programs on the DSP chip. Since the DSP is dedicated to executing fast Fourier transforms (FFTs) as efficiently as possible for real time spectral analysis and filtering, the DSP is much faster than a standard microprocessor chip for the D/A and A/D conversions.

Figure 2:
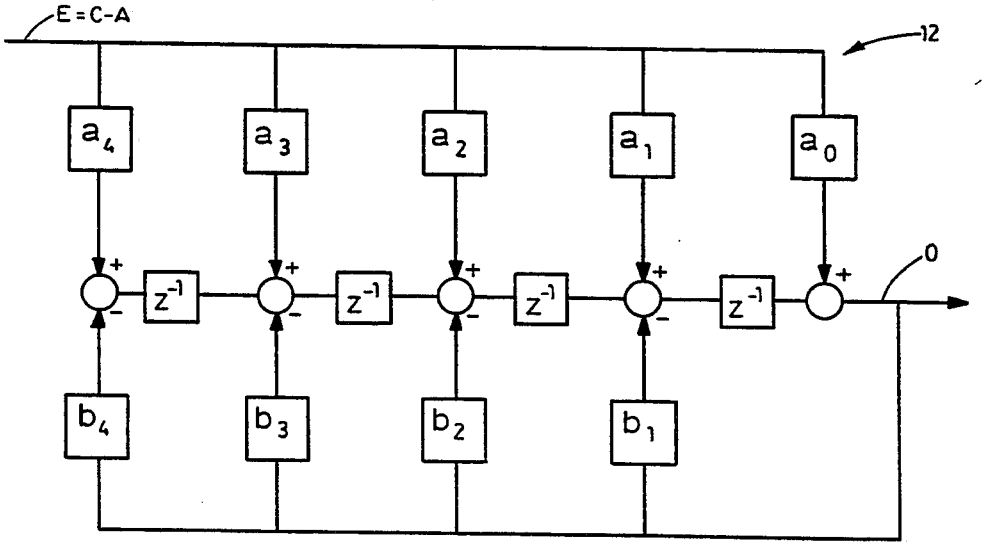
FIG. 2 is a diagram of a z-plane digital implementation of an $H_\infty$ controller in the control system of FIG. 1.

Referring to FIG. 2, there is illustrated a Z-plane block diagram showing the operation of the $H_\infty$ controller (12). An example of a transfer function of the $H_\infty$ controller (12) executed on the DSP chip is as follows:

$$H(z) = \frac{a_0 + a_1z^{-1} + a_2z^{-2} + a_3z^{-3} + a_4z^{-4}}{1 + b_1z^{-1} + b_2z^{-2} + b_3z^{-3} + b_4z^{-4}}$$

where each $z^{-1}$ represents a time delay of one sample period and "a" and "b" are coefficients as predetermined. The illustrated transfer function is a reduced 4th order one which involves a series of sample and holds that holds the previous four samples and with each new sample the oldest sample is dropped so that only the latest four samples are retained at all times. The four samples are modified by predetermined constants or coefficients "a" and "b" to come up with the command error signal E going into the E-M actuator (14).

Thus, the $H_\infty$ controller (12) is always commanding the E-M actuator (14) based on what has been done in the past and as one gets further from the past the most distant time sample is dropped out and the current time sample is added on. The command input signal C to the $H_\infty$ controller (12) is derived from the output signal A from the E-M actuator (14) via the feedback loop (16). As an example, the output signal A from the E-M actuator (14) might be a deflection or rotation. The signal going into the $H_\infty$ controller (12) is in the form of an error signal E which is a voltage signal derived from a measurement by a potentiometer to determine how much the actuator has rotated. That error signal E, which is the result of the output signal A subtracted from the command input signal C being inputted, is in the form of a voltage input into the $H_\infty$ controller (12).

TEST RESULTS

Figure 3:
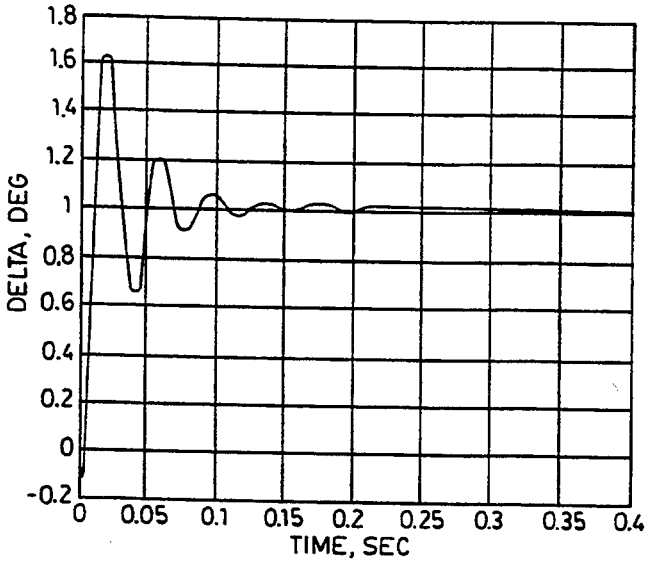
FIG. 3 is a graphical representation of a closed loop step response of E-M Actuator with a sampling time of 0.005 seconds.

In a tail control missile, the electromechanical actuator, which had satisfactory stability in bench tests, was found to have marginal stability when the error signal was sampled even at a fast 200-Hz rate. The closed-loop step response with sampling showed unacceptable oscillatory behavior. The closed-loop response to a unit step is shown in FIG. 3, which shows a highly oscillatory behavior with an initial overshoot of 65%, and five full cycles must occur before the oscillations die out. The dominant poles of the closed-loop system are at $-30.94 \pm i168.8$, which are very lightly damped, accounting for the unsatisfactory oscillatory behavior.

A preliminary seventh order $H_\infty$ controller was designed to be in series with the E-M open-loop actuator that greatly improved the stability. The seventh order $H_\infty$ control design eliminated the oscillatory behavior while improving the dynamic step response by reducing the settling time and increasing the damping as shown in the reduced overshoot. A reduced fourth-order $H_\infty$ controller was also designed that has frequency response characteristics very close to the full seventh-order $H_\infty$ controller with only a slight penalty in time response for the E-M actuator. The fourth-order controller reduces requirements on the microprocessor memory and speed while simplifying the hardware design. The fourth order controller will be briefly discussed later.

Figure 4:
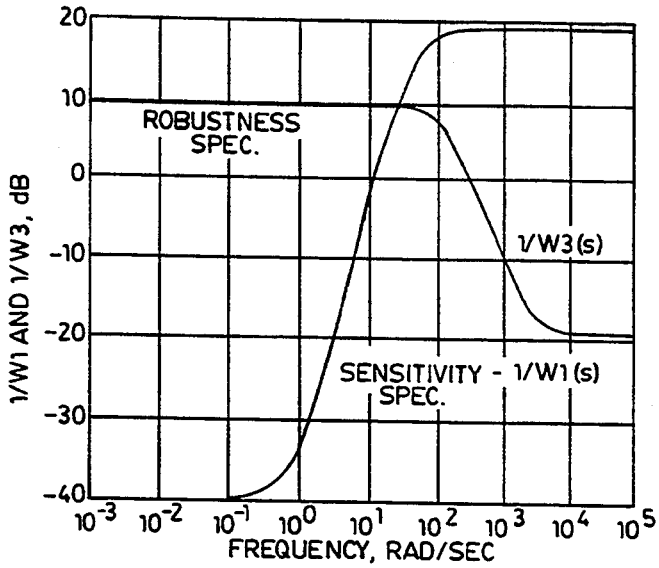
FIG. 4 is a graphical representation of the $H_\infty$ design sensitivity specification and the design robustness specification.
Figure 5:
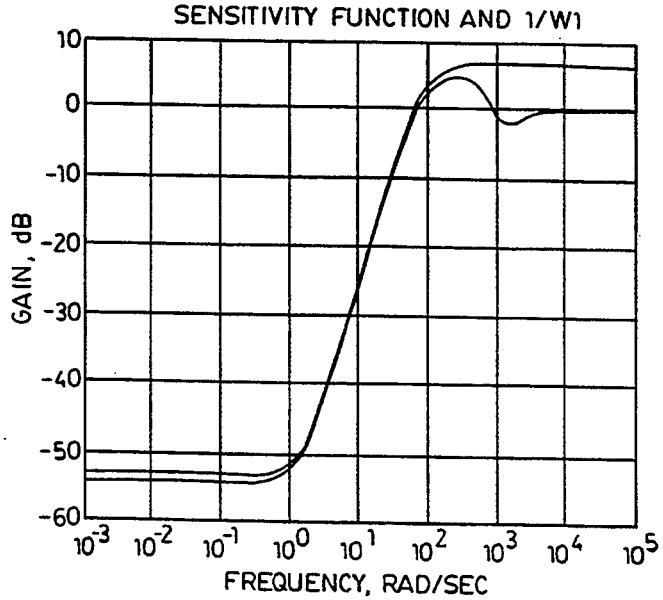
FIG. 5. is a graphical representation of the $H_\infty$ actual performance specification and sensitivity function for a value of Gamma=4.85.
Figure 6:
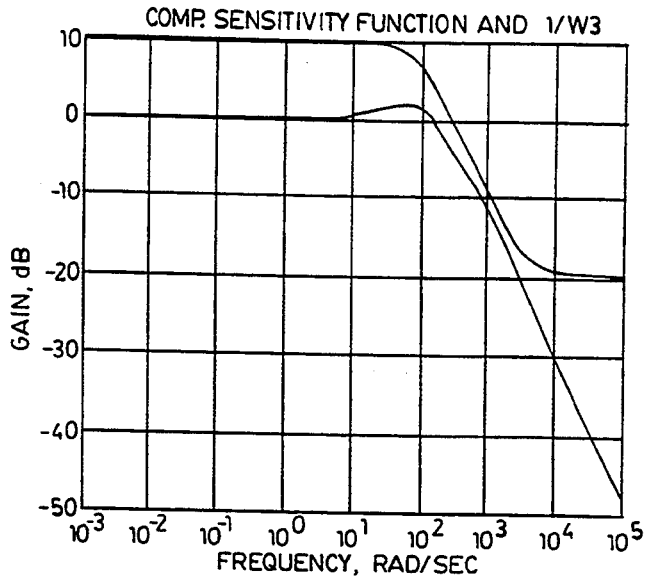
FIG. 6. is a graphical representation of the $H_\infty$ actual robustness specification and complementary sensitivity for a value of Gamma equal to 4.85.

FIG. 4 shows the performance specification $|W_1(j\omega)^{-1}|$ in a Bode plot that was used for the E-M actuator preliminary design, which requires a sensitivity reduction of 100:1 for frequencies up to 1 rad/sec. In addition, the robustness boundary was specified to provide 10 dB of gain below 10 rad/sec and suppress to $-20$ dB above $10^4$ rad/sec. For an $H_\infty$ solution to exist, the 0 dB frequency crossover of the performance specification must be sufficiently below the frequency of the 0 dB crossover of the robustness specification. The performance specification $|W_1(j\omega)^{-1}|$ is given in terms of a parameter Gamma ($\Gamma$) as below:

$$W_1(s)^{-1} = (\Gamma^{-1})*(0.01)*(1+s)^2/(1+s/10)$$

and $\Gamma$ is increased from 1 to the value, which causes the cost function Tylul to go to 0 dB gain. For purposes of these tests, the value of Gamma ($\Gamma$) which causes the cost function Tylul to go to 0 dB was determined to be 4.85

Figure 7:
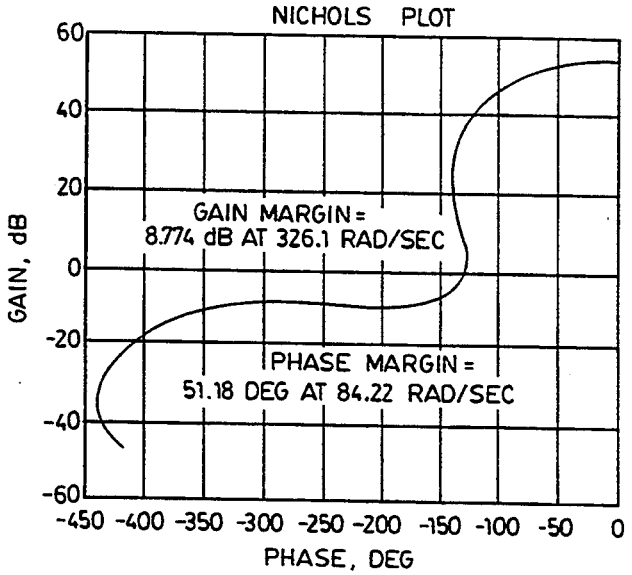
FIG. 7. is a graphical representation of the Nichols stability plot for $H_\infty$ Controlled E-M Actuator as an open loop plant for a value of Gamma equal to 4.85.
Figure 8:
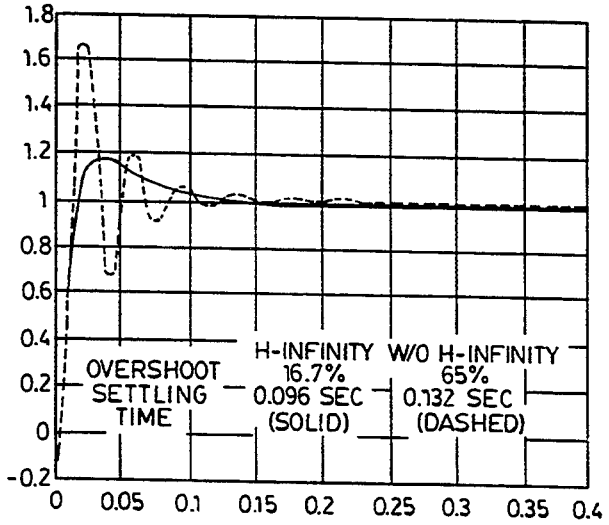
FIG. 8. is a graphical representation of the step response of E-M Actuator with and without the $H_\infty$ controller.

The stability margins are graphically displayed in the Nichols plot in FIG. 7. The gain margin for the open-loop plant has been increased from 4.24 to 8.77 dB by using the $H_\infty$ stabilizing controller. The phase margin has been increased from 19.45 to 51.18 degrees with the $H_\infty$ controller. Examination of the closed-loop step response in FIG. 8 shows much improved damping with an overshoot of only 16.7% and no oscillatory behavior. The E-M actuator specification requires an overshoot less than 20%, which the $H_\infty$ controller meets, and the system without the $H_\infty$ controller fails even when sampling is not taken into account. The $H_\infty$ controller has a shorter time response. The settling time after which the amplitude stays within 2% of the steady state value is 0.132 second for the actuator without the $H_\infty$ controller and 0.096 seconds with the $H_\infty$ controller. A direct comparison of the E-M actuator with and without the controller is shown in FIG. 9. The $H_\infty$ controller thus improves the stability, reduces overshoot, eliminates the oscillatory behavior, and shortens the time response of the E-M actuator.

A reduced-order controller design was investigated, since less computer memory would then be required and hardware complexity would be reduced as long a performance is still acceptable.

The effect of the fourth-order $H_\infty$ controller on the stability and time response of the electromechanical actuator is described below. The gain margin is 8.90 dB and the phase margin is 50.05°, which is not much different than the 8.77 dB and 51.18° stability margins for the full seventh-order $H_\infty$ controller. The time response reveals that the damping of the E-M actuator is slightly worse for the fourth-order controller with an overshoot of 22.1% versus 16.7% for the full seventh-order controller. The specification for maximum overshoot must be relaxed for this design to be acceptable. The settling time to within 2% of the final steady state value for the step response is slightly increased from 0.096 second for the seventh-order $H_\infty$ controller to 0.098 second for the reduced fourth-order $H_\infty$ controller. The reduced fourth-order controller does reduce the requirements for memory and speed for the microchip used to implement the controller, since only the four previous values of $\delta$ and $\delta_c$ are required to be saved, multiplied, and added instead of seven for the full controller.

To summarize, the $H_\infty$ control design is used in the present invention to improve the stability and eliminate the oscillatory behavior of the E-M actuator (14). The $H_\infty$ concept involves shaping the frequency response of the actuator (14) by an $H_\infty$ stabilizing controller (12) which will achieve high system gains at the lower frequencies for good disturbance rejection and low gains at higher frequencies so as not to excite fundamental structural modes and unmodeled system dynamics.

The uniqueness of the present invention is believed to be due to the following two aspects. The first aspect is the application of $H_\infty$ control theory to controlling the frequency response of a single-input single-output actuator. Previous applications of $H_\infty$ control theory have been to multiple-input multiple-output control systems, such as autopilot design of aircraft and missiles as well as stability augmentation of large flexible space structures. The same actuator can now have its frequency response tailored for more than one type of missile or aircraft. The second aspect is the use of a high speed DSP chip for implementation of the $H_\infty$ controller at the high sampling rates required. The DSP chip allows a much faster sampling rate and large enough memory capacity to handle the $H_\infty$ implementation in connection with an E-M actuator for missile control applications. Using the first structural mode frequency of a missile to define the upper robustness bound of the missile the actuator response can be tailored to optimize performance without exciting aero-elastic vibrations in the missile using $H_\infty$ design. The bandwidth of the E-M actuator can be increased to take full advantage of the missile airframe design without causing undesirable oscillations which would impair control of the missile.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A single-input single-output control system, comprising:

(a) an H-infinity controller having an input for receiving a command input signal and an output for producing an output signal;

(b) an electro-mechanical (E-M) actuator connected in series with said H-infinity controller and having an input for receiving said output signal from said H-infinity controller and an output for producing an output signal representative of an action taken by said E-M actuator;

(c) a feedback loop connected in series with said E-M actuator and said H-infinity controller for transferring said output signal of said E-M actuator to said input of said H-infinity controller for combining with said command input signal and inputting an error input signal to said H-infinity controller; and (d) said H-infinity controller performing a time-related sequence of samples and continuously holding a predetermined number of most recent ones of said samples and modifying said samples by applying predetermined constants thereto to derive said error signal outputted to said E-M actuator in order to improve the stability of said E-M actuator.

2. The system of claim 1 further comprising a digital-to-analog (D/A) converter interposed in series between said H-infinity controller and said E-M actuator.

3. The system of claim 1 further comprising an analog-to-digital (A/D) converter interposed in said feedback loop in series between said E-M actuator and said H-infinity controller.

4. The system of claim 1 wherein said H-infinity controller operates in accordance with a nth order transfer function as follows:

$$H(z) = \frac{a_0 + a_1z^{-1} + a_2z^{-2} + a_3z^{-3} + \ldots + a_nz^{-n}}{1 + b_1z^{-1} + b_2z^{-2} + b_3z^{-3} + \ldots + b_nz^{-n}}$$

where each $z^{-1}$ represents a time delay of one predetermined sample period, and coefficients a and b are H-infinity coefficients for said E-M actuator, said E-M actuator having predetermined specification boundaries for robustness and performance.

5. A single-input single-output control system, comprising:

(a) an H-infinity controller having an input for receiving an command input signal and an output for producing an output signal;

(b) an electro-mechanical (E-M) actuator connected in series with said H-infinity controller and having an input for receiving said output signal from said H-infinity controller and an output for producing an output signal representative of an action taken by said E-M actuator;

(c) a digital-to-analog (D/A) converter interposed in series between said H-infinity controller and said E-M actuator;

(d) a negative unity feedback loop connected in series with said E-M actuator and said H-infinity controller for transferring said output signal of said E-M actuator to said input of said H-infinity controller for combining with said command input signal and inputting an error input signal to said H-infinity controller;

(e) an analog-to-digital (A/D) converter interposed in said negative unity feedback loop in series between said E-M actuator and said H-infinity controller; and (f) said H-infinity controller performing a time-related sequence of samples and continuously holding a predetermined number of most recent ones of said samples and modifying said samples by applying predetermined constants thereto to derive said error signal outputted to said E-M actuator in order to improve the stability of said E-M actuator.

6. The system of claim 5 wherein said H-infinity controller operates in accordance with a nth order transfer function as follows:

$$H(z) = \frac{a_0 + a_1z^{-1} + a_2z^{-2} + a_3z^{-3} + \ldots + a_nz^{-n}}{1 + b_1z^{-1} + b_2z^{-2} + b_3z^{-3} + \ldots + b_nz^{-n}}$$

where each $z^{-1}$ represents a time delay of one predetermined sample period.

* * * * *